UNITED STATES PATENT OFFICE 2,207,430

COLOR STABILIZATION OF PETROLEUM DISTILLATES

Robert E. Burk and Herman P. Lankelma, Cleveland, Ohio, assignors to The Standard Oil Company, Cleveland, Ohio, a corporation of Ohio No Drawing. Original application August 19, 1935, Serial No. 36,849. Divided and this application August 16, 1937, Serial No. 159,322

3 Claims. (Cl. 44—9)

It has been known for some time that certain chemical agents when added to cracked gasoline have a tendency to restrain the formation of gum which is otherwise prone to occur. It has been found on more extended experience also that some of the particularly effective agents of such character do not protect the gasoline against color deterioration and clouding on exposure to light. Especially also where lead compounds and dyes are employed in the gasoline, as is increasingly prevalent, this latter condition is aggravated, and an anti-knock gasoline may cloud or darken and a dyed gasoline may objectionably change color in a short light-exposure in a curb-pump. In accordance with the present invention however, changes from light-exposure can be obviated and this irrespective of anti-knock compounds, dyes, etc., and with assurance of stability against gum also.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Pursuant to our invention, a volatile petroleum distillate is subjected to the action of a small amount of an agent of lecithin type of structure,

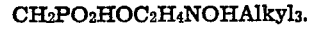

Of this of course, lecithin proper is the best example. Lecithin occurs quite widely in the animal and vegetable kingdom, varying only slightly in its chemical detail. It is commercially produced especially from egg yolk and from soya beans. Soya beans contains around 1.5 per cent in general. Physically it is a greasy solid with low melting point, very readily soluble in gasoline, but insoluble in water. This latter fact is of notable advantage in that condensation-water which almost inevitably occurs in gasoline-storage tanks can thus not preferentially dissolve out the agent and carry it down from the gasoline, as is the case with a number of agents which have been heretofore introduced for gum-inhibiting purposes. The usually accepted chemical structure of lecithin proper is

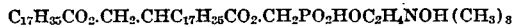

However, the fatty acid radical may be stearic, palmitic, oleic, or mixtures of these. Beside lecithin, there may also be used with the present invention, hydrogenated lecithin, and phosphoric esters of amine alcohols. The amounts of the agent employed may vary, in general being 0.0002 to 0.5 per cent. In concentration as low as 0.01 g. per gallon it is effective for color stabilizing, but it is much more effective in concentrations of 0.03 to 0.05 g. or more per gallon. As indicated, its particular field of activity is color stabilization. It is without value against gum formation. Certain anti-gum agents however which are subject to the draw-back of having a tendency of occasioning darkening and discoloration in a gasoline may, when supplemented by lecithin or the like in accordance with the present invention, be corrected as to this tendency, while providing an anti-gum action. Thus, such anti-gum agents as alpha naphthol; 1,5-dihydroxynaphthalene; ortho benzyl amino phenol; o-amino phenol; phenolic fractions of wood tar distillates, or other anti-gum agent and the lecithin or the like may be used in combination. The result is an effective suppression of gum and a stabilizing of the gasoline against color change irrespective of light-exposure.

In anti-knock motor fuels, such as gasoline containing lead tetraethyl, and gasoline containing dyes, for instance orange dye or red dye or other coloring dye, the lecithin is particularly advantageous. A gasoline of these orders is thereby assured against tendency to go off color even though left in the sun-light for extended periods. In similar manner, that peculiar tendency of some gasolines to cloud up on light-exposure, is corrected by the present invention. Such volatile petroleum distillates also as kerosene which has a tendency to become discolored on light-exposure, are also notably beneficially treated by this method.

As an example: To a cracked gasoline there is added a phenolic fraction of a wood tar distillate at the rate of 0.5 g. and lecithin at the rate of 0.05 g. per gallon.

As another example: To kerosene there is added lecithin in amount of 0.1 g. per gallon.

As another example: To kerosene there is added a phenolic fraction of wood tar distillate at the rate of 0.5 g. and lecithin at the rate of 0.05 g. per gallon.

This application is a division of our application Ser. No. 36,849, filed August 19, 1935.

Other modes of applying the principle of the invention may be employed, change being made as regards the details described, provided the features stated in any of the following claims, or the equivalent of such, be employed.

We therefore particularly point out and distinctly claim as our invention:

1. In the manufacture of light petroleum distillates, subjecting a kerosene distillate to the action of a small amount of lecithin and a small amount of a wood phenolic distillate.

2. A light stable kerosene containing a small amount of lecithin and a small amount of a wood phenolic distillate.

3. A light-stable kerosene containing lecithin in an amount of from 0.0002 to 0.5% and a small amount of a wood phenolic distillate.

ROBERT E. BURK.
HERMAN P. LANKELMA.